(12) United States Patent
Huang et al.

(10) Patent No.: US 12,242,673 B1
(45) Date of Patent: Mar. 4, 2025

(54) INFORMATION HANDLING SYSTEM KEYBOARD COLOR ADJUSTABLE BACKLIGHT

(71) Applicant: Dell Products L.P., Round Rock, TX (US)

(72) Inventors: Wen-Pin Huang, New Taipei (TW); Yao-Hsien Huang, New Taipei (TW); Hsien-Tsan Chang, Taoyuan (TW); Yi-Chen Wang, Taoyuan (TW); Po-Chun Hou, Taiwan (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/241,003

(22) Filed: Aug. 31, 2023

(51) Int. Cl.
  *G06F 3/02* (2006.01)
  *G06F 1/16* (2006.01)
  *G06F 3/041* (2006.01)
  *G06V 10/56* (2022.01)
  *H01H 13/83* (2006.01)

(52) U.S. Cl.
  CPC ............ *G06F 3/021* (2013.01); *G06F 1/1616* (2013.01); *G06F 1/1662* (2013.01); *G06F 3/0202* (2013.01); *G06F 3/0219* (2013.01); *G06F 3/0412* (2013.01); *G06V 10/56* (2022.01); *G09G 2320/062* (2013.01); *G09G 2320/066* (2013.01); *G09G 2320/0666* (2013.01); *G09G 2360/144* (2013.01); *H01H 13/83* (2013.01)

(58) Field of Classification Search
  CPC ........ G06F 3/021; G06F 3/041; G06F 3/0416; G06F 1/1616; G06F 1/1662; G06F 3/0489; G06F 3/1423; G06F 3/0202; G06F 3/0412; G09G 2354/00; G09G 2360/144; G09G 3/2003; G09G 2320/066; G09G 3/3406; G09G 3/3413; H01H 13/83; H01H 13/70
  See application file for complete search history.

(56) References Cited

U.S. PATENT DOCUMENTS

| | | | |
|---|---|---|---|
| 7,446,303 B2 | 11/2008 | Maniam et al. | |
| 7,750,282 B2 | 7/2010 | Mahowald et al. | |
| 8,698,727 B2 | 4/2014 | Herz et al. | |
| 10,170,080 B2* | 1/2019 | Kim | H05B 47/11 |
| 10,510,305 B2 | 12/2019 | Files et al. | |
| 10,811,201 B1 | 10/2020 | Files et al. | |
| 11,048,119 B2* | 6/2021 | Chen | H01H 13/83 |
| 2008/0165116 A1* | 7/2008 | Herz | G09G 3/3406 345/98 |
| 2008/0252589 A1* | 10/2008 | Chung | G09G 3/3607 345/102 |

(Continued)

*Primary Examiner* — Dismery Mercedes
(74) *Attorney, Agent, or Firm* — Zagorin Cave LLP; Robert W. Holland

(57) ABSTRACT

An information handling system keyboard illuminates key values in each of plural keycaps with a backlight located below the plural keys and directed upward through the plural keys and having illumination that adjusts color temperature under management of a controller. A light sensor detects ambient light color temperature and communicates the ambient light color temperature to the controller, which executes instructions in non-transitory memory to adjust the backlight color illumination based on the detected ambient light color temperature to increase color contrast of backlight illumination relative to ambient light and thereby better highlight the key values on the keycap upper surfaces.

6 Claims, 4 Drawing Sheets

(56) References Cited

U.S. PATENT DOCUMENTS

| | | | |
|---|---|---|---|
| 2010/0300856 A1* | 12/2010 | Pance | H05B 45/20 |
| | | | 315/149 |
| 2010/0328935 A1* | 12/2010 | Pance | G06F 1/3265 |
| | | | 313/504 |
| 2011/0074690 A1* | 3/2011 | Broga | H05B 47/10 |
| | | | 345/169 |
| 2014/0028565 A1* | 1/2014 | Gueorguiev | G06F 1/1662 |
| | | | 345/168 |
| 2015/0108903 A1* | 4/2015 | Sun | G06F 1/00 |
| | | | 315/153 |
| 2015/0370339 A1* | 12/2015 | Ligtenberg | G06F 3/0219 |
| | | | 345/168 |
| 2017/0303365 A1* | 10/2017 | Chen | H05B 45/20 |
| 2018/0052524 A1* | 2/2018 | Peterson | G02B 6/0068 |
| 2018/0122598 A1* | 5/2018 | Kuscher | H01H 13/83 |
| 2019/0051267 A1* | 2/2019 | Johnson | G06F 1/1616 |
| 2020/0211795 A1* | 7/2020 | Wang | H01H 13/83 |
| 2024/0003528 A1* | 1/2024 | Zhang | H01H 13/83 |
| 2024/0047155 A1* | 2/2024 | Huffman | H01H 13/84 |

\* cited by examiner

INFORMATION HANDLING SYSTEM KEYBOARD COLOR ADJUSTABLE BACKLIGHT

BACKGROUND OF THE INVENTION

Field of the Invention

The present invention relates in general to the field of information handling system keyboards, and more particularly to an information handling system keyboard color adjustable backlight.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In a clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

In many instances, the keyboards integrated in portable information handling systems include a backlight that illuminates the keys to improve usage when in a low light ambient environment. For instance, an end user can turn on the backlight when operating in dark conditions, such as an aircraft interior at night, so that the key values are visible. Typically, when a keyboard has a backlight the key values are presented at the key caps with a translucent outline so that the backlight shines through the key value to highlight the key value for the end user. The highlighted key value stands out with good contrast when the key cap has a black color around the key value. In some information handling systems, the housing and keyboard keycaps are made with a light and even reflective surface. For instance a housing made with aluminum might have a light color keycap, such as silver, to provide an aesthetically pleasing appearance. A difficulty that arises with the use of light colored keycaps is that the keycaps tend to reflect ambient light. The closer the ambient light matches the backlight illumination, the less effective the backlight illumination is at highlighting the key value. An end user can attempt to increase the intensity of the backlight to make the highlighted key value greater in intensity than the reflected light, however that approach tends to increase power consumption and decrease battery life.

SUMMARY OF THE INVENTION

Therefore, a need has arisen for a system and method which backlights an information handling system keyboard effectively with reflective keycaps.

In accordance with the present invention, a system and method are provided which substantially reduce the disadvantages and problems associated with previous methods and systems for backlight illumination at an information handling system keyboard. An information handling system keyboard backlight adjusts color temperature of illumination to keyboard keys to enhance color contrast with ambient light reflected from the keyboard keycap upper surfaces.

More specifically, a portable information handling system integrates a keyboard in a housing to accept end user key inputs by presses at the keyboard keys. Key values defined in the keys indicate the value input by a press of the key and are illuminated by a backlight disposed below the keys. A light sensor, such as an ambient light sensor or camera, detects ambient light conditions at the keyboard so that a processing resource executing instructions stored in non-transitory memory can adjust the keyboard backlight illumination brightness and color temperature based upon detected ambient light brightness and color temperature to highlight by greater color contrast the key values illuminated by the keyboard backlight.

The present invention provides a number of important technical advantages. One example of an important technical advantage is that an end user is provided with enhanced highlighting of keycap values due to color contrast between illumination provided by the keyboard backlight under the keyboard keys and ambient light that reflects from the keyboard keycap upper surfaces. The enhanced illumination provided by color contrast reduces the brightness of keyboard backlight illumination needed for a desired end user visibility of the key values so that power consumed to backlight the keyboard is reduced.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system keyboard backlight adjusts color temperature of illumination to keyboard keys to enhance color contrast with ambient light reflected from the keyboard keycap upper surfaces. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
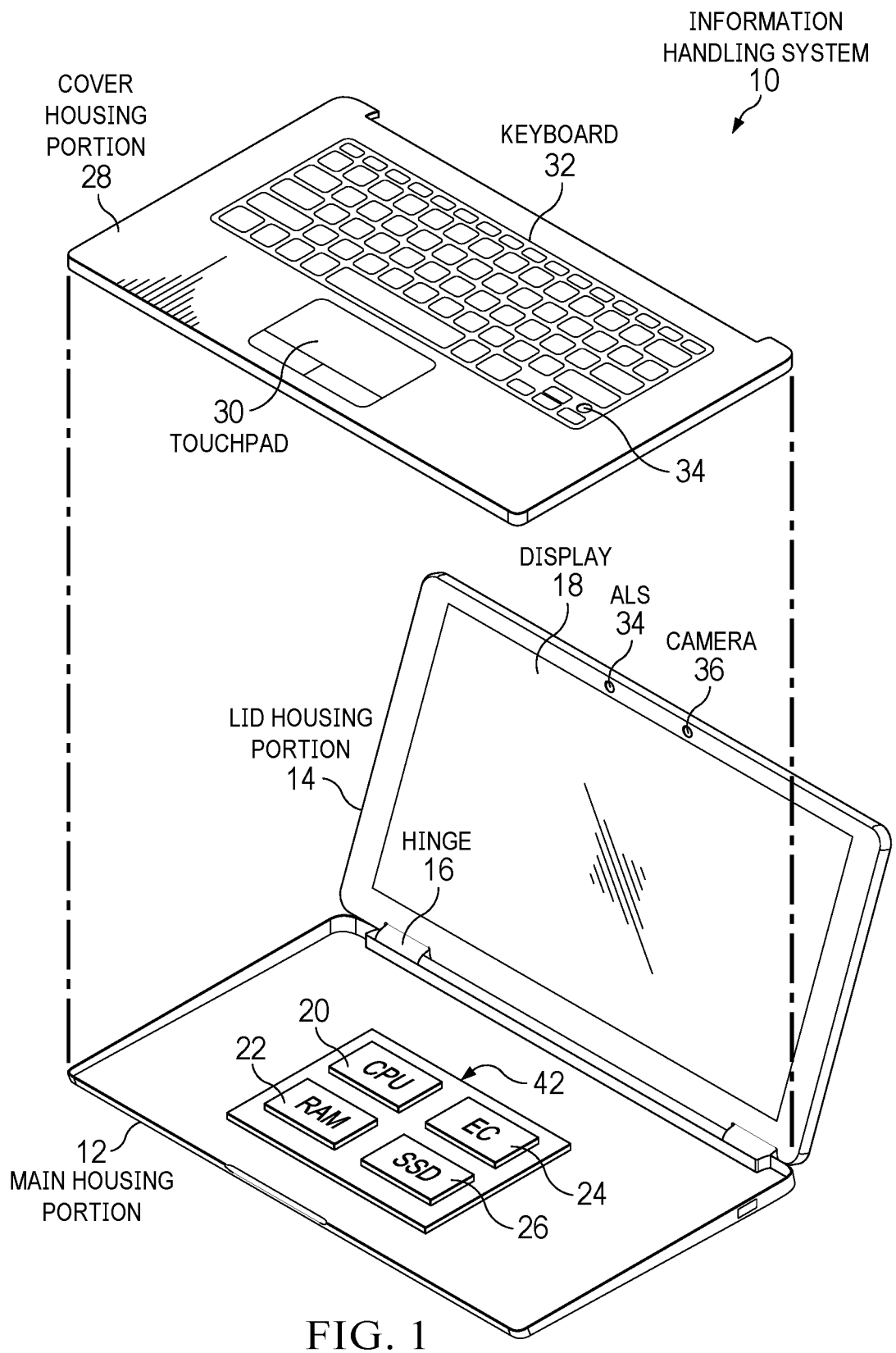
FIG. 1 depicts an exploded perspective view of a portable information handling system configured to adjust keyboard backlight illumination color temperature based upon ambient light color temperature and key reflectivity characteristics.

Referring now to FIG. 1, an exploded perspective view depicts a portable information handling system 10 configured to adjust keyboard 32 backlight illumination color temperature based upon ambient light color temperature and key reflectivity characteristics. In the example embodiment, portable information handling system 10 is built into a portable housing with a convertible configuration having a main housing portion 12 rotationally coupled to a lid housing portion 14 by a hinge 16. A display 18 integrates in lid housing portion 14 to present information as visual images, such as with a liquid crystal display (LCD) panel or an organic light emitting diode (OLED) film. A motherboard 42 coupled to main housing portion 12 supports communication between processing components that cooperate to process information. For example, a central processing unit (CPU) 20 executes instructions that process information in cooperating with a random access memory (RAM) 22 that stores the instructions and information. An embedded controller (EC) 24 manages operating conditions within the system, such as application of power, thermal conditions and interactions with human interface devices. A solid state drive (SSD) 26 has persistent storage that stores information and instructions during system power down, such as an operating system and applications that are recalled to RAM 22 at system power up. Main housing portion 12 has a cover housing portion 28 coupled over the processing components and supporting a keyboard 32 and touchpad 30 to accept end user inputs. For example, an end user makes key inputs by pressing down on keycap upper surfaces of plural keys included in the keyboard. Key inputs are communicated by embedded controller 24 to CPU 20 for use as inputs to an executing operating system and/or application.

Portable information handling system 10 includes an ambient light sensor (ALS) 34 and camera 36 in lid housing portion 14. ALS 34 detects ambient light brightness and color temperature to adjust how visual images are presented at display 18. For instance, very bright ambient light conditions may be used to command a more bright presentation at display 18 so that visual images are visible, and very dim ambient light conditions may result in a more dim presentation of visual images. In some instances, ambient color temperature detected by the ALS is applied to change the color of visual images presented at the display so that the visual images have a desired appearance. Camera 36 captures visual images in a viewing zone of display 18, such as to capture visual images of an end user in support of a videoconference. When visual images are captured by camera 36, the visual images include information on the ambient light conditions that can be used in a similar manner to the output of ALS 34, such as an ambient light brightness and color temperature. In order to illuminate the keys of keyboard 32 in an effective manner, ambient light brightness and color temperature are applied to illuminate the backlight with a color contrast that sufficiently highlights key values presented on the keycaps. For example, when a reddish ambient light is reflected from the keycap upper surface, illuminating the keyboard with more blue and green light and less red light will contrast the key value etched on the keycap upper surface. In this manner, the key values are highlighted with a reduced brightness that reduce backlight power consumption. In the example embodiment, a second ALS 34 couples to keyboard 32 in plane with the keyboard keys so that the ambient light measured by ALS 34 at the keyboard key plane is the ambient light that reflects from the keycap upper surfaces.

Figure 2:
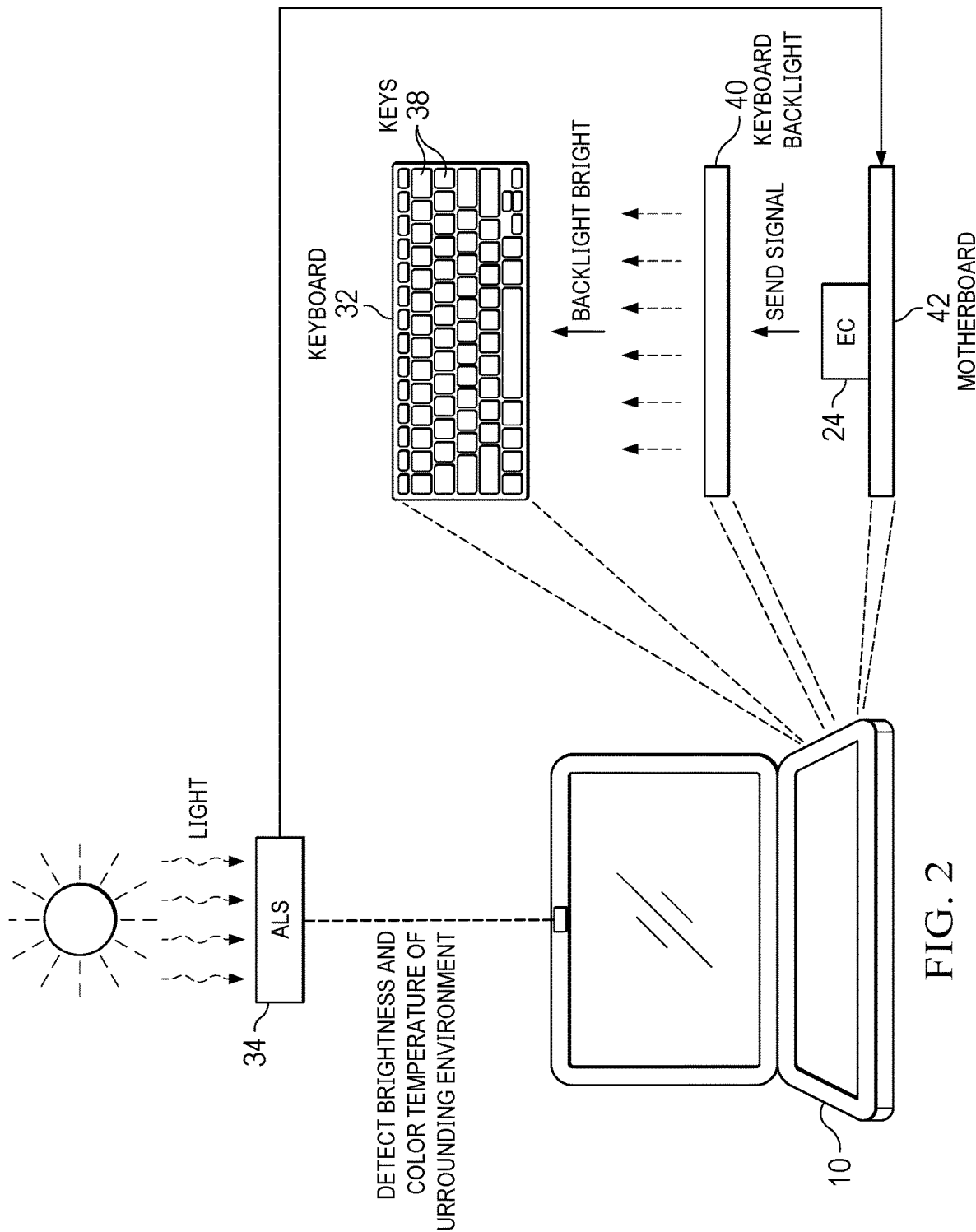
FIG. 2 depicts a logical block diagram of management of keyboard backlight illumination color temperature adjustment based upon ambient light color temperature and keycap upper surface reflection characteristics.

Referring now to FIG. 2, a logical block diagram depicts management of keyboard backlight illumination color temperature adjustment based upon ambient light color temperature and keycap upper surface reflection characteristics. Information handling system 10 has an ALS 34 coupled to a lid housing portion to detect ambient light brightness and color temperature. A keyboard 32 rests on information handling system 10 with plural keys 38 that accept end user presses to input a value etched on the upper surface of each key 38. As an example, the keys 38 are a translucent material with the key value formed by a paint or other treatment on the upper surface so that illumination from a keyboard backlight 40 below keyboard 32 illuminates through the translucent material. Embedded controller 24 on motherboard 42 executes firmware instructions stored in integrated flash memory to send control signals to keyboard backlight 40 that adjust the backlight brightness and color temperature based upon sensed ambient light brightness and color temperature. For example, keyboard backlight 40 has a plurality of mini-LEDs that each include red, green and blue LED elements to generate white light. When the ambient color temperature has a red, green or blue tint, the backlight changes the color of the illumination through the keyboard to increase the color contrast with the ambient light so that the keycap identification markings are more readily readable. In addition, keyboard backlight 40 adjusts the brightness in view of the color contrast so that the keycap markings are distinguishable without excessive illumination that distracts an end user and increases power consumption. The color contrast between ambient light and backlight illumination is a function in part of the reflective characteristics of the keycap treatment so that a reflectivity value of the keycap upper surface may also be considered. For example, some keycap surface treatments might have a greater reflection in some light spectrums so that those light spectrums will appear brighter than other surface treatments that absorb ambient light. Embedded controller 24 can store the keyboard keycap surface reflectivity to use as part of the determination of backlight brightness and color temperature. Alternatively, the embedded controller may retrieve the reflectivity value from the keyboard or the logic to determine if the backlight color temperature may be performed locally with a processing resource of the keyboard.

Figure 3:
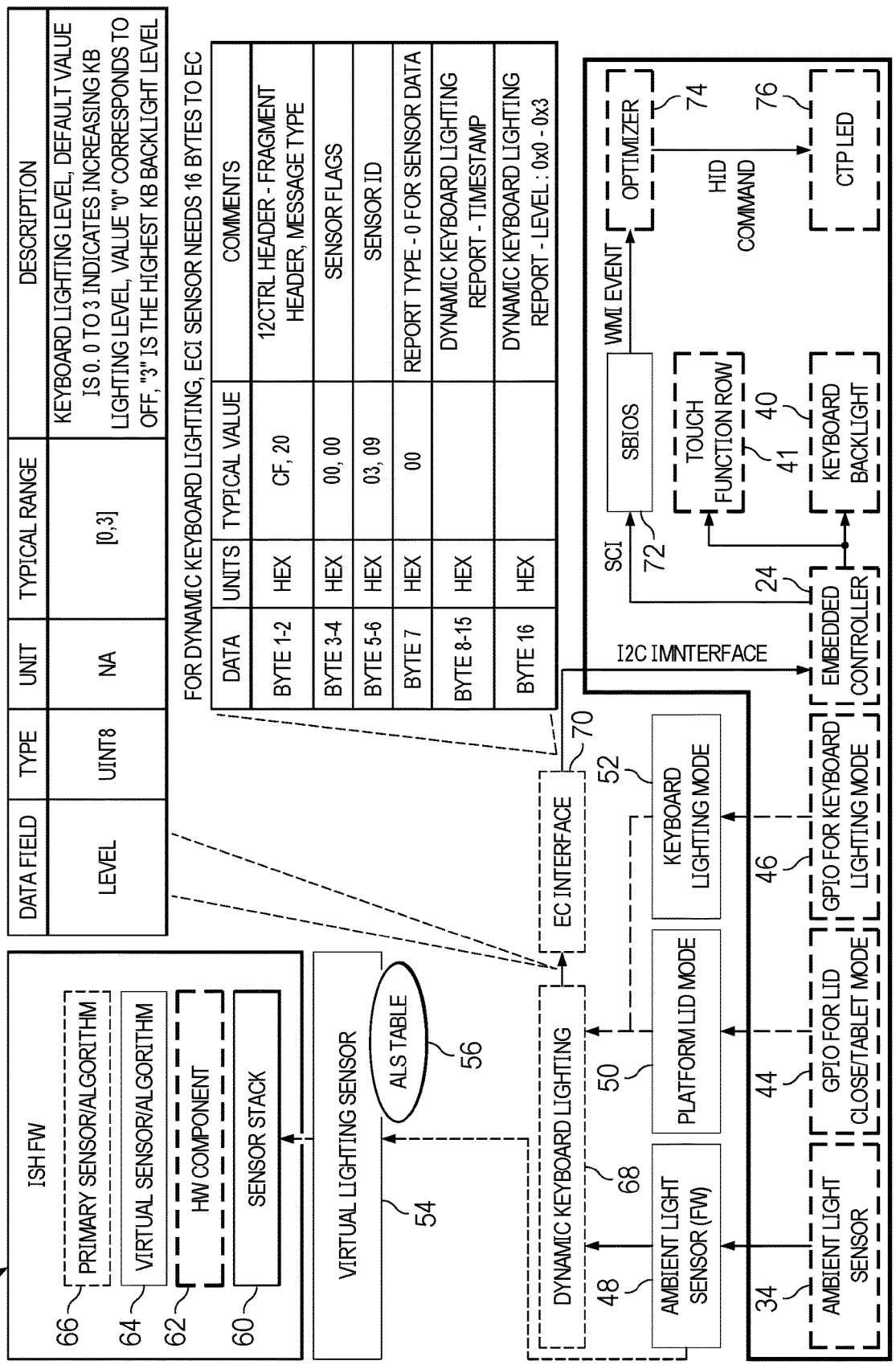
FIG. 3 depicts a block diagram of a keyboard and related systems that manage keycap backlight illumination color contrast based upon ambient light.

Referring now to FIG. 3, a block diagram depicts a keyboard and related systems that manage keycap backlight illumination color contrast based upon ambient light. In the example embodiment, a physical layer of physical devices interact through a firmware layer with a processor, such as a CPU integrated sensor hub (ISH) as defined by INTEL. The physical layer includes an ambient light sensor 34 that senses ambient light brightness and color temperature, a housing lid sensor 44 that outputs a GPIO signal for the housing lid as open or closed, and a keyboard light switch 46 that outputs a GPIO to indicate whether keyboard backlight illumination is on or off. Embedded controller 24 interfaces with CPU ISH 58 through an I2C interface and a keyboard processing resource 41 that detects key inputs and a keyboard backlight 40 that outputs keyboard backlight illumination. An embedded controller interface 70 in a firmware layer provides embedded controller 24 with communications to retrieve physical device status and command device outputs. The firmware layer is, for example, instructions stored in non-transitory memory, such a flash integrated circuit. The firmware layer includes ambient light sensor firmware 48 that reports ambient light conditions to a dynamic keyboard lighting firmware 68, a platform lid mode forward 50 that reports housing lid position and a keyboard lighting mode firmware 52 that reports the keyboard backlight illumination state. A virtual light sensor 54 in the firmware includes an ALS table 56 that defines keyboard backlight illumination output for detected ambient light conditions, such as keyboard backlight brightness and color temperature for illumination output based upon detected ambient light brightness and color temperature. The defined backlight illumination may include a compensation for reflectivity of the keyboard keycap upper surface or a separate reflectivity value may be included so that keyboard backlight output depends in part on a reflectivity reported for the keyboard.

In the example embodiment, instructions executing on ISH 58, such as firmware instructions or operating system drive instructions, manage the keyboard illumination. A sensor stack 60 reports sensed conditions of hardware components 62 to a virtual sensor algorithm 64 and primary sensor algorithm 66 so that commanded keyboard backlight illumination is communicated through embedded controller 24 to the keyboard backlight 40 to output a keyboard backlight color temperature and brightness. In one example embodiment, the embedded controller may manage illumination through an SBIOS 72 with Windows Management Interface events to optimizer application 74 that controls CTP LED 76 output through an HID command. The example embodiment depicts a control table example to define keyboard backlight illumination as a 16 byte value. Although the example embodiment describes keyboard control through cooperation of a processor, operating system and embedded controller, in alternative embodiments, keyboard processing resource 41 may perform the backlight illumination determination and command. For example, a peripheral keyboard separate from an information handling system may perform all or some of the backlight illumination determinations locally based upon an ALS located in plane with the keyboard keys and reporting directly to the keyboard processing resource.

Figure 4:
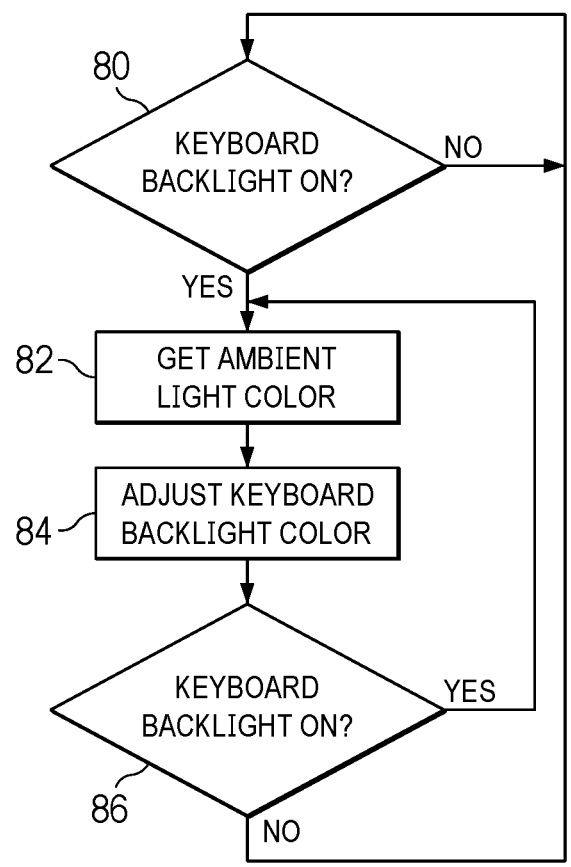
FIG. 4 depicts a flow diagram of a process for adjusting keyboard backlight color illumination based upon ambient light color temperature.

Referring now to FIG. 4, a flow diagram of a process for adjusting keyboard backlight color illumination based upon ambient light color temperature. The process starts at step 80 with a determination of whether the keyboard backlight is on. When the keyboard backlight illumination is commanded on, the process continues to step 82 to get the ambient light conditions, such as the ambient light brightness and color temperature. At step 84, the keyboard backlight brightness and color temperature are adjusted to enhance highlighting of the keyboard key values with an illumination having enhanced color contrast between the ambient light reflected from the keyboard key upper surface and the illumination through the key values by the keyboard backlight. The adjustment in keyboard backlight color temperature and brightness may include consideration of a variety of factors. One factor is a determination of how the ambient light conditions are determined, such as by an ALS on the housing lid, an ALS in plane with the keyboard keys to more directly measure the light that reflects from the keycap upper surfaces, a camera that captures a visual image to determine ambient light conditions and/or a camera that captures a visual image of the keyboard keycap upper surfaces to directly measure the reflected light. Another factor is the reflectivity of the keycap upper surface, which impacts how much light in a spectrum the keyboard keycap upper surfaces reflect. The reflectivity may be preprogramed in the keyboard and retrieved to an embedded controller that manages keyboard backlight illumination or may be pre-loaded in the embedded controller. In one example embodiment, other external factors may be measured, such as the brightness and color temperature of visual images presented by a display of the information handling system. For instance, as visual images are presented by the display, the brightness and color temperature of the visual images may be communicated to the embedded controller to proactively adjust keyboard backlight brightness and color temperature based upon the light reflected from the keycaps due to display images. At step 86, a determination of whether the keyboard backlight is on is performed. When the keyboard backlight remains on, the process returns to step 82 to continue monitoring ambient light. When the keyboard backlight is turned off, the process returns to step 80 to monitor or detect if the keyboard backlight illumination is turned back on.

Although the present invention has been described in detail, it should be understood that various changes, substitutions and alterations can be made hereto without departing from the spirit and scope of the invention as defined by the appended claims.

What is claimed is:

1. A method for illuminating an information handling system keyboard backlight, the method comprising:
   detecting ambient light color temperature proximate the keyboard with a light sensor;
   adjusting keyboard backlight illumination color temperature to increase color contrast of backlight that passes through a value formed in each keyboard key with the ambient light color temperature reflected from an upper surface of each the keyboard key;

tracking a color temperature of visual images presented at a display of the information handling system; and adjusting the keyboard backlight illumination at least in part based upon the color temperature of the visual images to increase the color contrast with the color temperature of the visual images.

2. The method of claim 1 further comprising:

detecting ambient light color temperature with a camera operable to capture a visual image;

identifying one or more of the plural keys from the visual image; and using a color temperature of light reflected from the keyboard keys to adjust the backlight illumination color temperature to increase color contrast with the light reflected from the keyboard keys.

3. The method of claim 1 further comprising:

reading from non-transitory memory of the keyboard a reflectivity value of the keyboard key caps; and adjusting the keyboard backlight illumination color temperature to increase color contrast based at least in part on the reflectivity value.

4. The method of claim 1 further comprising:

detecting ambient light color temperature with an ambient light sensor disposed in plane with the keyboard keys; and estimating a color temperature of light reflected from the keyboard keys based upon the ambient light color temperature and a reflectivity value of the keyboard keys upper surface.

5. The method of claim 1 wherein the adjusting keyboard backlight illumination is performed with instructions executed on an embedded controller of the information handling system.

6. The method of claim 1 wherein the adjusting keyboard backlight illumination is performed with instructions executed on a controller included with the keyboard.

* * * * *

UNITED STATES PATENT AND TRADEMARK OFFICE
CERTIFICATE OF CORRECTION

PATENT NO. : 12,242,673 B1  
APPLICATION NO. : 18/241003  
DATED : March 4, 2025  
INVENTOR(S) : Wen-Pin Huang et al.

Page 1 of 1

It is certified that error appears in the above-identified patent and that said Letters Patent is hereby corrected as shown below:

In the Claims

In Column 7, Line 3, please replace "each the keyboard key" with --each of the keyboard keys--.

Signed and Sealed this  
First Day of April, 2025

Coke Morgan Stewart  
*Acting Director of the United States Patent and Trademark Office*